United States Patent
Drew

(10) Patent No.: US 7,441,274 B1
(45) Date of Patent: *Oct. 21, 2008

(54) METHOD AND APPARATUS FOR MINIMIZING FILE SCANNING BY ANTI-VIRUS PROGRAMS

(75) Inventor: Jeffrey M. Drew, Middletown, NJ (US)

(73) Assignee: McAfee, Inc., Santa Clara, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/095,247

(22) Filed: Mar. 30, 2005

Related U.S. Application Data

(63) Continuation of application No. 09/664,919, filed on Sep. 18, 2000, now Pat. No. 6,928,555.

(51) Int. Cl.
*G06F 21/00* (2006.01)

(52) U.S. Cl. .............................. 726/24; 726/22; 726/26; 713/187; 713/188

(58) Field of Classification Search ................ 713/188, 713/187; 726/24, 22, 26
See application file for complete search history.

(56) References Cited

U.S. PATENT DOCUMENTS

| | | | | | |
|---|---|---|---|---|---|
| 5,796,825 | A | * | 8/1998 | McDonnal et al. | 713/165 |
| 5,826,013 | A | * | 10/1998 | Nachenberg | 726/22 |
| 5,918,008 | A | * | 6/1999 | Togawa et al. | 726/24 |
| 6,021,510 | A | * | 2/2000 | Nachenberg | 714/38 |
| 6,449,652 | B1 | * | 9/2002 | Blumenau et al. | 709/229 |
| 6,847,984 | B1 | * | 1/2005 | Midgley et al. | 707/204 |
| 6,928,555 | B1 | | 8/2005 | Drew | 713/201 |
| 7,032,114 | B1 | * | 4/2006 | Moran | 713/187 |
| 7,058,975 | B2 | * | 6/2006 | Edwards et al. | 726/22 |
| 7,210,040 | B2 | * | 4/2007 | Jordan | 713/187 |
| 2002/0157008 | A1 | * | 10/2002 | Radatti | 713/188 |

OTHER PUBLICATIONS

Jan Hruska, "Virus Detection", European Conference on Security und Detection, Apr. 28-30, 1997, Conference Publication No. 437, IEE, 1997; pp. 128-131.*

* cited by examiner

*Primary Examiner*—Carl Colin
(74) *Attorney, Agent, or Firm*—Zilka-Kotab, PC; Christopher J. Hamaty

(57) ABSTRACT

Scanning time for a computer anti-virus program is minimized by eliminating scanning of a file for viruses before closure, in response to the absence of a modification flag being raised in an associated operating system, the flag being indicative of the file having been modified between the time the file was opened to the time of a close request.

14 Claims, 4 Drawing Sheets

METHOD AND APPARATUS FOR MINIMIZING FILE SCANNING BY ANTI-VIRUS PROGRAMS

This is a Continuation application of prior application Ser. No. 09/664,919 filed on Sep. 18, 2000, now U.S. Pat. No. 6,928,555, the disclosure of which is incorporated herein by reference.

FIELD OF THE INVENTION

The present invention relates generally to computer programs for providing anti-virus protection for computers from computer viruses, and more specifically to optimization of the performance of such anti-virus computer programs.

BACKGROUND OF THE INVENTION

The design and implementation of anti-virus computer programs for protecting computers from damage and/or interruption of operation due to computer viruses are well known in the art. A great deal of time and effort is spent in the design of such anti-virus programs to reduce the amount of computer time required by such programs for detecting viruses in computer files, and preventing detected virus contaminated or infected files from being written onto the hard drive or other storage media associated with a particular computer system or server. The use of computer networks for interconnecting a plurality of computers, either on a local or wide area network, has provided increasingly greater opportunity for so-called "computer hackers" to introduce viruses into the associated computers. The now widespread use of the Internet, and World Wide Web, has caused a major increase in the introduction of computer viruses into computer systems connected to such networks. In turn, anti-virus programs have to be continuously updated and expanded in order to recognize, cope with, and cleanse infected computer files of myriad viruses that may be introduced by hackers. As the number of computer viruses scanned for by anti-virus programs increases, the time required for scanning a given file for any such viruses increases in proportion to the increase in the number of viruses. Accordingly, computer programmers associated with the design of anti-virus computer programs are continuously searching for methods to reduce the computer time these programs must spend in scanning files for viruses.

In U.S. Pat. No. 5,649,095, entitled "Method and Apparatus For Detecting Computer Viruses Through The Use Of A Scan Information Cache", the length information of one portion of a file, e.g. a fork, is upon opening stored in a cache. Upon initiating a scan of the file, the length of the portion of the file corresponding to the portion in cache is compared to the length of the latter. If a size difference is detected, the file is only scanned for viruses which cause a change in the length or size of that portion of a file, thereby eliminating spending time scanning for other viruses. The teachings of U.S. Pat. No. 5,649,095 are incorporated herein by reference to the extent they do not conflict herewith.

In U.S. Ser. No. 09/481,060, filed Jan. 11, 2000, owned by the same Assignee as the present invention, and entitled "Fast Virus Scanning Using Scanning Stamping," a unique session key is created for each execution of anti-virus software, and is used to create a session stamp for each file scanned during the associated execution. The session stamps are stored for use by the anti-virus software to validate a session stamp when a request for an associated file is made. A file is scanned if the session stamp is invalid or absent for that file.

SUMMARY OF THE INVENTION

An object of the present invention is to provide a method for minimizing the scanning of an opened file for viruses between the time a user requests closure of the file, and the time that the file is actually closed, typically upon writing back to a hard disk or to a floppy disk.

In one embodiment of the invention, the aforesaid object and other objects of the invention are met by including computer code in the anti-virus program to respond to a request for closure of a file by a user of a particular computer or computer system, by first determining whether a flag has been set or raised by the operating system indicating that the file was modified between the time it was open to the time when the user requested closure of the file. Certain operating systems provide such modification flags through the use of a "dirty cache buffer." If such a flag is set or raised indicating that the file was modified during this time, the computer coding causes the anti-virus program to scan the file for known viruses, and if a file is found to be infected by a virus, the anti-virus program prevents the file from being written back into the hard disk, or other storage media of the system, until such time that the file is cleansed of the virus. However, if no flag was detected indicating that the file was modified during the time that it was opened, then the file is considered to be unmodified and free of viruses. The operating system is then released by the antivirus program to write the file into the desired storage media, such as a hard disk. Accordingly, the present invention avoids wasting valuable computer time in scanning open files, or checking file information caches, for viruses before they are closed, by taking advantage of operating systems that are designed to raise or set a flag whenever a file that has been opened is modified during the time that it has been opened.

In a second embodiment of the invention, if upon a user request to close an open file a modification flag is detected for the file, the next step is to determine whether the file was modified in a portion of the file that viruses can enter. If such a modification was made, the file is scanned. If such a modification was not made, the operating system is released to close the file.

BRIEF DESCRIPTION OF THE DRAWINGS

Various embodiments of the present invention will be described in detail below with reference to the drawings, in which like items are identified by the same reference designation, wherein.

DETAILED DESCRIPTION OF THE INVENTION

Figure 1:
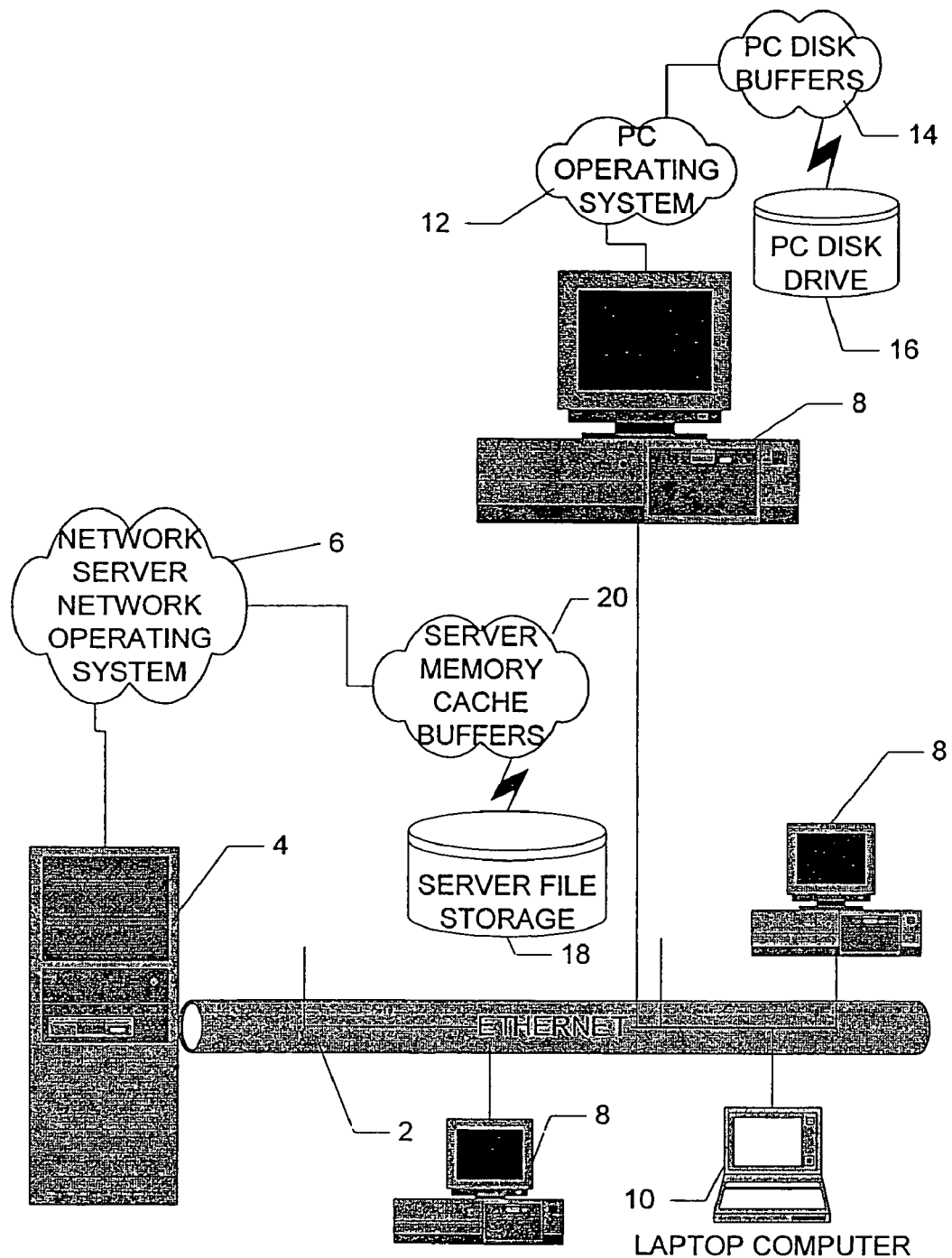
FIG. 1 shows a typical local area computer network of the prior art, in this example Ethernet, for connecting a network server network operating system with a plurality of personal computer operating systems, such as desktop systems, laptop computers, and so forth.

As shown in FIG. 1, a typical local area network known as an Ethernet 2 is used to permit a network server computer 4 loaded with an appropriate network operating system 6 to communicate with a plurality of personal computers such as desk top personal computers 8, and typical laptop personal computers 10, include a hard disk drive 16 for storing a PC operating system 12, and other programs and data. Disk buffers 14 provide an interface between the hard disk drive 16 and the central processing unit (not shown) of the personal computer 8, for permitting the operating system 12 to provide computer code for running the central processing unit, and other subsystems of the personal computer 8. A similar configuration is used in laptop 10. In the server computer 4, a memory device 18 is provided for storing files, and for storing an operating system for driving the central processing unit (not shown) of the server 4, in applications where another memory device is not available for storing the network operating system 6. Cache buffers 20 provide an interface for the temporary storage of files retrieved from the file storage memory 18 for distribution from the server to 1 of the personal computers 8 or laptop computers 10, in this example, connected to the Ethernet 2.

Figure 2:
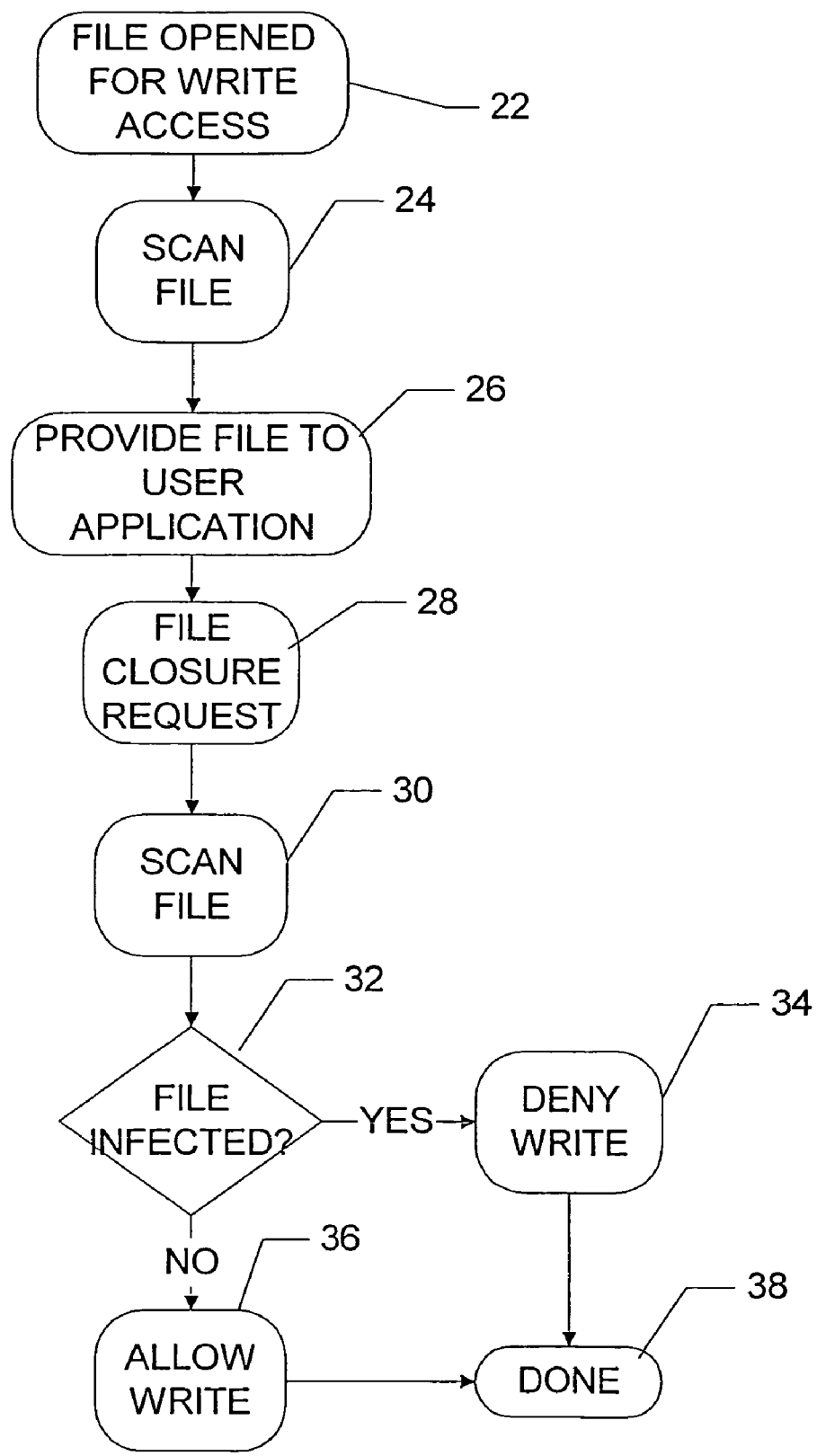
FIG. 2 is a flowchart showing the traditional scanning method of the prior art for the typical steps associated with scanning an open file for viruses.

In the present state of the art, computer systems that are properly configured for providing protection against computer viruses, typically permit the opening and closing of files using the steps shown in the flowchart of FIG. 2. A user of a personal computer 8 or laptop computer 10, as shown in FIG. 1, can request the server computer 4 to open a file for write access, as indicated by step 22. Please note that although various embodiments of the present invention are described in association with a computer network, such as the Ethernet 2 of FIG. 1, the invention is not so limited, and can be implemented through use of any other known network. Also, various embodiments of the present invention are applicable for use by a user directly on their own dedicated personal computer 8 or laptop 10. For these and other computer figurations, it is typical after a file is opened for write access in step 22, to next scan the file for viruses in step 24, via a computer anti-virus program. If no viruses are detected in step 24, step 26 is entered for providing the requested file to the Application program of the user. A period of time after the file is opened, it is typical that a user will request that the file be closed. Upon a file closure request being made in step 28, the typical anti-virus program loaded into a computer system, such as network server computer 4, interfaces with the network operating system 6 to scan the file for viruses in step 30 before permitting the file to be written back into memory. As shown in decision step 32, if a file is found to be infected with a virus, the anti-virus program proceeds to step 34 for preventing the infected file from being written into memory, such as file storage memory 18. Alternatively, if in step 32 no virus is uncovered, the anti-virus program proceeds to step 36 for allowing the operating system to write the file back into memory. The last step 38, indicative that scanning has been completed, terminates the typical virus protection program scanning routine. Note that in some state-of-art operating systems, the cache buffers 20 are used to store files upon opening in an unmodified state. Before step 36, the file to be closed is compared to the corresponding unmodified file in a cache buffer memory 30. If the file to be closed is found to be identical to the unmodified cached file, write step 36 is skipped, and the open file is closed with only the file's time stamp being updated. In computers not loaded with an anti-virus program, the file comparison occurs after step 28.

Figure 3:
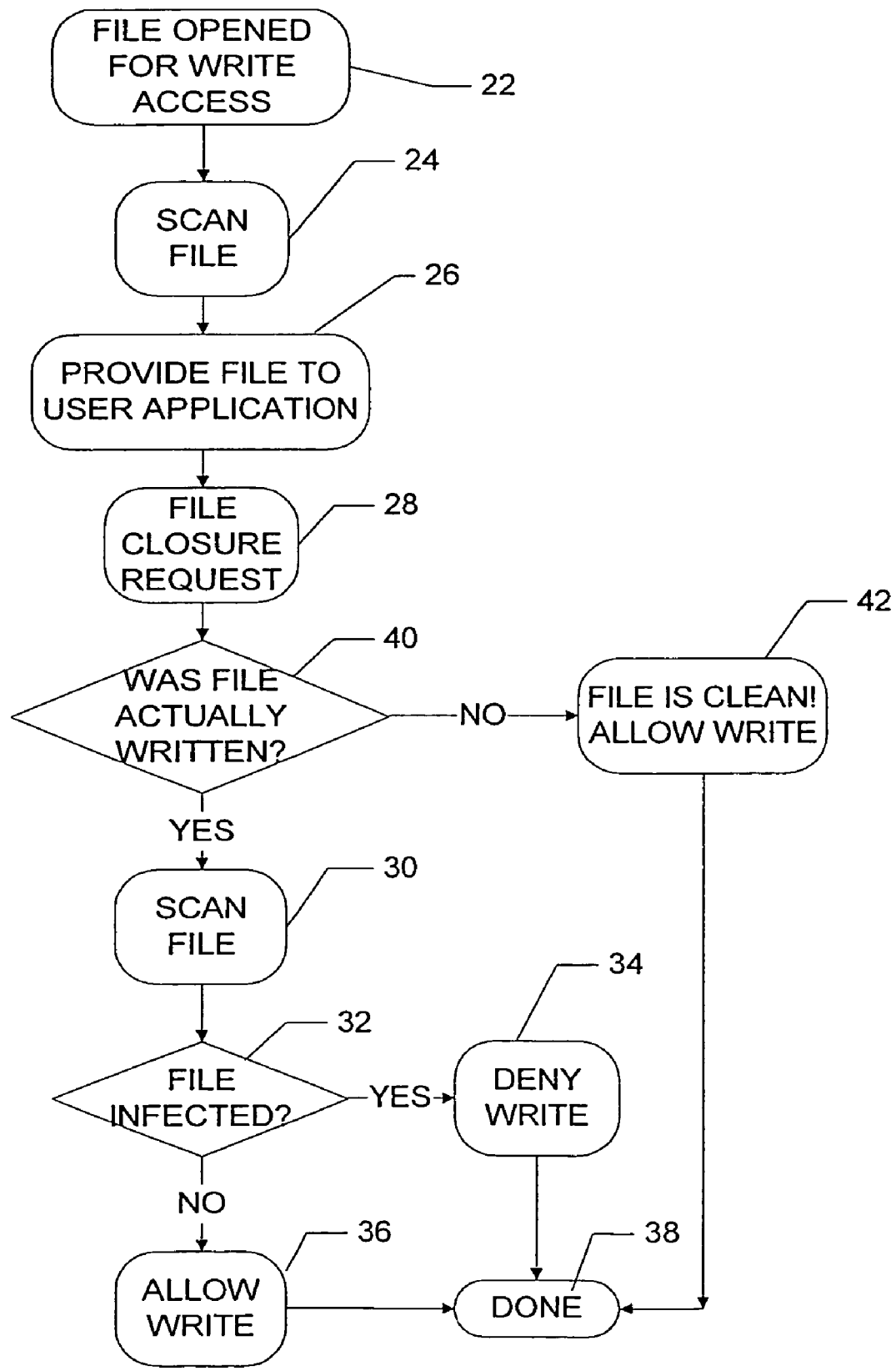
FIG. 3 shows a flowchart for one embodiment of the invention for minimizing the unnecessary scanning of an open file for viruses before the file is closed.

With reference to FIG. 3, a first embodiment of the invention provides additional steps for an anti-virus program operating in conjunction with an operating system. Note that steps 22, 24, 26, 28, 30, 32, 34, 36, and 38 are the same as the traditional scanning steps for an anti-virus program of FIG. 2. In this first embodiment of the invention, new steps 40 and 42 are included. As shown, step 40 is a decision step interposed between steps 28 and 30. Decision step 40 determines whether a file was actually written, that is modified by the user performing some writing step on the open file. The computer coding for step 40 determines whether an open file was actually written or modified by looking for a flag in the operating system indicative of such modification. Many state-of-art operating systems provide such flags, which are used by the operating system to avoid rewriting a file back into memory if it has not been modified. If the anti-virus program in step 40 does find that a modification flag has been set or raised by the operating system, then step 30 is entered into for scanning the file for viruses. If on the other hand no modification flag is found, the file is considered clean, and the operating system is allowed to write the file back into the memory in step 42, as shown, or simply close the file. If an operating system does not provide such modification flags, the first embodiment of the invention can be extended to add cache buffer memories 20, and appropriate computer coding to incorporate the modification flag function into the operating system.

Note that one operating system that provides modification flags is the Novell NetWare 4.X® and later versions, which has a function call FEGetOpenFileInfo( ). One of the parameters of this function is a file handle that indicates a file has been opened. The aforesaid function call also includes a parameter known as "flags" field for providing flags to indicate the status of the file. Typically, such flags are not well documented by Novell®, but the inventor has determined through inquiry that such flags can be used to obtain what is known as a "dirty cache buffer" state of the file. Such a flag provides an indication of whether a file was modified. The associated operating system uses such flags for optimizing closure of open files, by avoiding the time for rewriting to disk if the file was not modified as indicated by the lack of file modification flag being set or raised. As previously indicated, the first embodiment of the present invention uses the absence of such modification flags after a call for closure of a file to avoid scanning the file for viruses, and uses the presence of such a modification flag to scan the file for viruses before permitting writing of the file back into memory.

Figure 4:
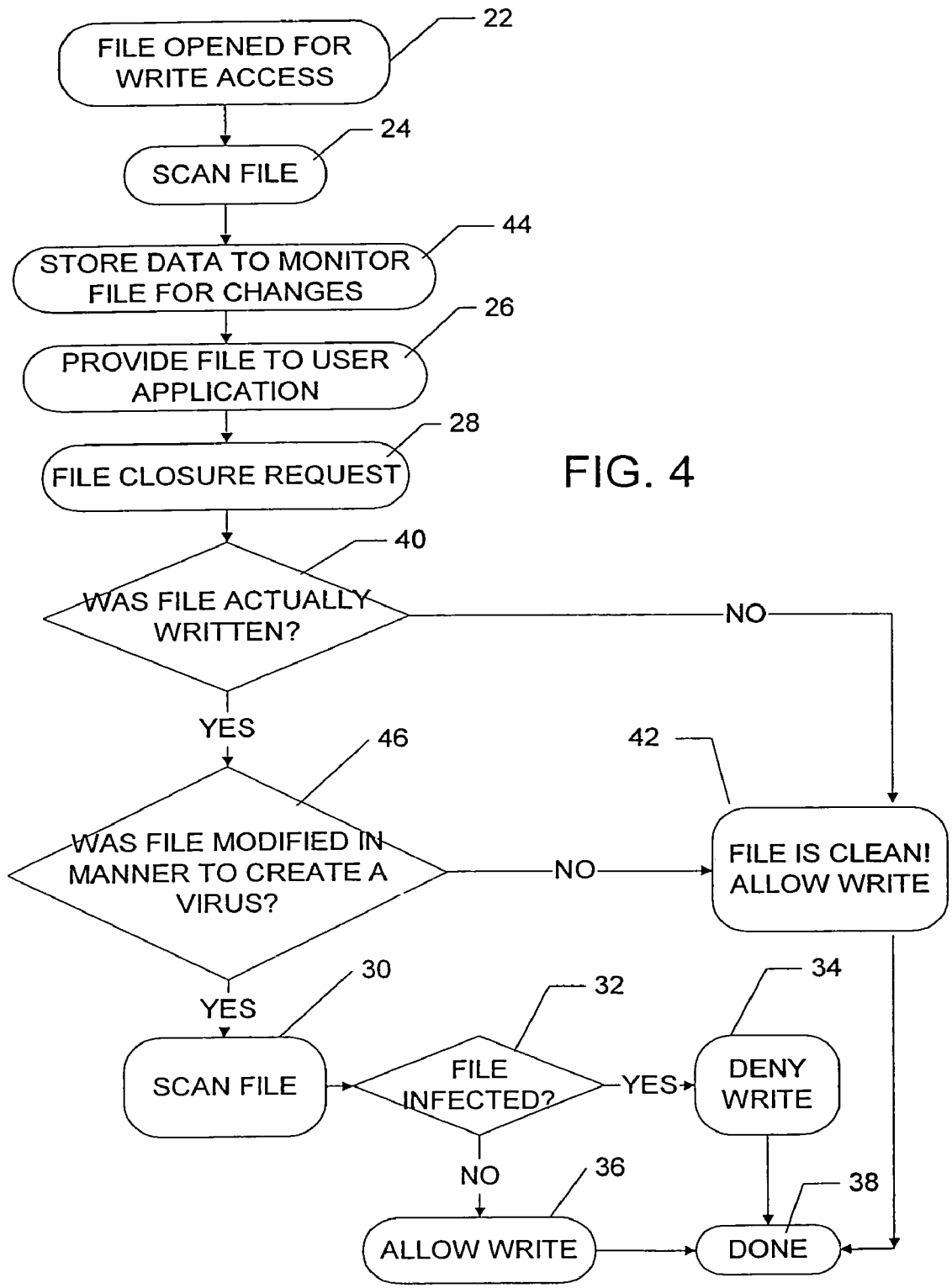
FIG. 4 shows another embodiment of the invention for minimizing the necessity of scanning an open file for viruses before it is closed in the presence of a file information cache or any other optimization cache.

A second embodiment is shown in the flowchart of FIG. 4. In comparing this second embodiment of the invention with the first embodiment shown in FIG. 3, note that the second embodiment includes a new step 44 between both steps 24 and 26, and another new step 46 between both steps 40 and 42, and steps 40 and 30, as shown in FIG. 4. More specifically, step 44 uses a full cache buffer memory 20 for storing an entire file. Typically there are specific portions of a file that a virus must use by necessity in order to invade the file. In operation of the programming steps of the second embodiment of the invention, if in step 40 a flag indicative of modification of the file is not detected, the present computer program proceeds through steps 42 and 38, as in the first embodiment of the invention of FIG. 3. If however, a modification flag is detected, step 46 is entered for determining whether the file was modified in a manner that would permit a virus to invade the file. Step 46 is carried out by determining whether any of the file portions stored in step 44, when compared to the open file for which a closure has been requested, has changed, indicating a file modification. If not modified, the programming proceeds with steps 42 and 48. If however, it is determined that the file was modified in a manner to permit a virus to invade the file, such as the head end being changed, or a macro being changed or added in the word portion, the anti-virus program proceeds to step 30, and therefrom to step 32 and operates as previously described for the first embodiment of the invention of FIG. 3.

Note that there are anti-virus programs known in the art that utilize a cache memory for storing data or file information upon the opening of a particular file, which information is indicative of the unmodified section or computer coding of a file that must be modified in order for a virus of a particular type to have an opportunity to invade that file. A cache memory is used for storing such file coding for every virus the anti-virus program is capable of scanning for to prevent entry into the protected computer. Cozza U.S. Pat. No. 5,649,095 teaches the use of such a scan information cache for detecting a plurality of computer viruses, whereby a "fork" portion of a file is stored when the file is opened. If a request for closure of the particular file is made, the stored file data is compared to the same file data of the open file now requested for closure to determine if that data has been modified since opening the file. If modified, the anti-virus program scans the file for the type of virus that would invade that type of data or fork code portion of the file. However, the present inventor does not know of any anti-virus programs that combine a file data storage step, such as step 44, in combination with step 40 to determine whether an operating system has raised a modification flag, for providing criteria, such as in steps 40 and 46, for causing the anti-virus program to proceed to scan a file for viruses, as in step 30. Nor does the present inventor know of any anti-virus programs that monitor an operating system for the raising of a flag that indicates a file has been modified since opening, for example by accessing a preexisting "dirty cache buffer" in a server's operating system to check for the flag, for triggering the scanning of the file for viruses, or for avoiding scanning of a file for viruses if no flag has been raised, as in the first embodiment of the invention. Contrary to the teaching of U.S. Pat. No. 5,649,095 for storing a "fork" portion of a file, as indicated above, the second embodiment of the invention creates a "dirty cache buffer" in step 44 for storing the entire file for monitoring.

Although various embodiments of the invention have been shown and described, they are not meant to be limiting. Those of ordinary skill in the art may recognize certain modifications to these embodiments, which modifications are meant to be covered by the spirit and scope of the appended claims. For example, in another embodiment of the invention, network protocols are monitored to determine if a write packet was received by an associated computer or file server for a given open file to detect that a write event has occurred.

The invention claimed is:

1. A method, comprising:
  determining whether an operating system includes a "dirty cache buffer" to raise or set a modification flag relative to a file being modified during a time it has been open, a computer code being indicative of said flag;
  using said computer code for a raised or set modification flag, if available, for carrying out said modification determining by checking for the presence of said raised modification flag for said file;
  detecting a request for closure of said opened computer file;
  determining in response to and after the closure request, if said opened computer file has been modified since being opened;
  indicating that said opened computer file is unmodified if said opened computer file has not been modified, based on the determination; and
  scanning said opened computer file only if said opened computer file has been modified, based on the determination.

2. The method of claim 1, wherein if it is determined that said operating system does not provide said file modification flag, said method further including:
  establishing said "dirty cache buffer"; and
  raising said modification flag in said "dirty cache buffer" if said opened computer file associated with said flag has been modified by a write operation.

3. The method of claim 1, wherein said operating system includes said "dirty cache buffer" for providing said computer code for said modification flag indicative of the modification of said opened computer file, said method further including in said modification determining:
  detecting the presence of said modification flag to determine if said associated opened computer file has been modified.

4. The method of claim 3, further including:
  scanning said file for viruses in response to a request for opening said file;
  opening said file if virus free;
  establishing a cache buffer memory for storing upon opening of said file only a virus vulnerable portion of said file that a virus must use to enter and infect said file;
  said modification determining including:
  indicating said opened computer file is unmodified in the absence of an associated modification flag;
  responding to the presence of said modification flag by comparing a portion of said opened computer file to the associated unmodified virus vulnerable portion of said file in said cache buffer memory to determine if the portion of aid opened computer file has been modified since the opening of said file;
  indicating said opened computer file is unmodified if the virus vulnerable portion is unmodified; and
  indicating said opened computer file is modified if the virus vulnerable portion is modified.

5. The method of claim 1, wherein said determining in response to a closing request if said opened computer file has been modified since being opened includes:
  monitoring network protocols to determine if a write packet was initiated for a given open file.

6. A computer program product embodied on a computer readable storage medium for carrying out a method, the method comprising:
  determining whether an operating system includes a "dirty cache buffer" to raise or set a modification flag relative to a file being modified during a time it has been open, a computer code being indicative of said flag;
  using said computer code for a raised or set modification flag, if available, for carrying out said modification determining by checking for the presence of said raised modification flag for said file;
  detecting a request for closure of said opened computer file;
  determining in response to and after the closure request, if said opened computer file has been modified since being opened;
  indicating that said opened computer file is unmodified if said opened computer file has not been modified, based on the determination; and scanning said opened computer file only if said opened computer file has been modified, based on the determination.

7. The computer program product of claim 6, wherein if it is determined that said operating system does not provide said file modification flag, said method further including:
establishing said "dirty cache buffer"; and
raising said modification flag in said "dirty cache buffer" if said opened computer file associated with said flag has been modified by a write operation.

8. The computer program product of claim 6, wherein said operating system includes said "dirty cache buffer" for providing said computer code for said modification flag indicative of the modification of said opened computer file, said method further including in said modification determining:
detecting the presence of said modification flag to determine if said associated opened computer file has been modified.

9. The computer program product of claim 8, further including:
scanning said file for viruses in response to a request for opening said file;
opening said file if virus free;
establishing a cache buffer memory for storing upon opening of said file only a virus vulnerable portion of said file that a virus must use to enter and infect said file;
said modification determining including:
indicating said opened computer file is unmodified in the absence of an associated modification flag;
responding to the presence of said modification flag by comparing a portion of said opened computer file to the associated unmodified virus vulnerable portion of said file in said cache buffer memory to determine if the portion of said opened computer file has been modified since the opening of said file;
indicating said opened computer file is unmodified if the virus vulnerable portion is unmodified; and
indicating said opened computer file is modified if the virus vulnerable portion is modified.

10. The computer program product of claim 6, wherein said determining in response to a closing request if said opened computer file has been modified since being opened includes:
monitoring network protocols to determine if a write packet was initiated for a given open file.

11. A system, comprising:
means for determining whether an operating system includes a "dirty cache buffer" to raise or set a modification flag relative to a file being modified during a time it has been open, a computer code being indicative of said flag;
means for using said computer code for a raised or set modification flag, if available, for carrying out said modification determining by checking for the presence of said raised modification flag for said file;
means for detecting a request for closure of said opened computer file;
means for determining in response to and after the closure request, if said opened computer file has been modified since being opened;
means for indicating that said opened computer file is unmodified if said opened computer file has not been modified, based on the determination; and
means for scanning said opened computer file only if said opened computer file has been modified, based on the determination.

12. The system of claim 11, wherein said system further includes:
means for establishing said "dirty cache buffer"; and
means for raising said modification flag in said "dirty cache buffer" if said opened computer file associated with said flag has been modified by a write operation.

13. The system of claim 11, wherein said operating system includes said "dirty cache buffer" for providing said computer code for said modification flag indicative of the modification of said opened computer file, said system further including:
means for detecting the presence of said modification flag to determine if said associated opened computer file has been modified.

14. The system of claim 13, further including:
means for scanning said file for viruses in response to a request for opening said file;
means for opening said file if virus free;
means for establishing a cache buffer memory for storing upon opening of said file only a virus vulnerable portion of said file that a virus must use to enter and infect said file;
means for indicating said opened computer file is unmodified in the absence of an associated modification flag;
means for responding to the presence of said modification flag by comparing a portion of said opened computer file to the associated unmodified virus vulnerable portion of said file in said cache buffer memory to determine if the portion of said opened computer file has been modified since the opening of said file;
means for indicating said opened computer file is unmodified if the virus vulnerable portion is unmodified; and
means for indicating said opened computer file is modified if the virus vulnerable portion is modified.

* * * * *